April 23, 1963 MASANAO MATSUI ETAL 3,086,981
PROCESS FOR PREPARING VITAMIN A ESTERS
Filed Feb. 12, 1962
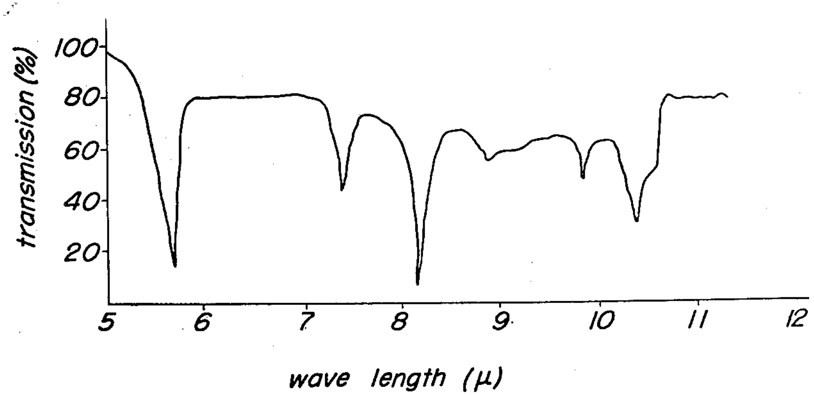

United States Patent Office 3,086,981

Patented Apr. 23, 1963

1

3,086,981

PROCESS FOR PREPARING VITAMIN A ESTERS

Masanao Matsui, Tokyo, Shigeya Saijo, Nishinomiya-shi, Kiyoshi Ohizumi, Ashiya-shi, and Teruya Nishida and Shigeru Okano, Toyonaka-shi, Japan, assignors to Sumitomo Chemical Company, Ltd., Osaka, Japan, a corporation of Japan

Filed Feb. 12, 1962, Ser. No. 172,553

6 Claims. (Cl. 260—410)

The present invention relates to a process for preparing vitamin A esters. More particularly, it relates to a process for preparing the esters of vitamin A by contacting vitamin A acid or its alkyl ester with lithium aluminum hydride in an inert medium and then decomposing the resulting lithium aluminum complex compound of vitamin A with a member selected from the group consisting of fatty acid halide and anhydride.

Various methods have heretofore been known for the preparation of vitamin A. One important method is the reduction of vitamin A acid or its ester with lithium aluminum hydride. Vitamin A is usually utilized in the form of a fatty acid ester, since the former is exceedingly unstable. Accordingly, vitamin A thus reduced has been acylated by a fatty acid chloride in the presence of pyridine, in the conventional procedure.

The present invention is based upon the discovery that the lithium aluminum complex resulting from the reaction of vitamin A acid or its ester with lithium aluminum hydride can be directly decomposed by acid halide or anhydride to yield vitamin A esters.

Thus, an object of the invention is to prepare vitamin A esters from vitamin A acid or its ester by a single process with an excellent yield and without contamination of impurities in the product.

Other objects and features of the invention will be apparent from the following description.

To accomplish the objects, the inventors provide a process for preparing vitamin A esters, which comprises contacting a member selected from the group consisting of vitamin A acid and its alkyl ester with lithium aluminum hydride in an inert medium, and then decomposing the resulting lithium aluminum complex compound of vitamin A with an acylating agent selected from the group consisting of fatty acid halide and anhydride.

The reaction of the invention can be illustratively shown by the following formulas.

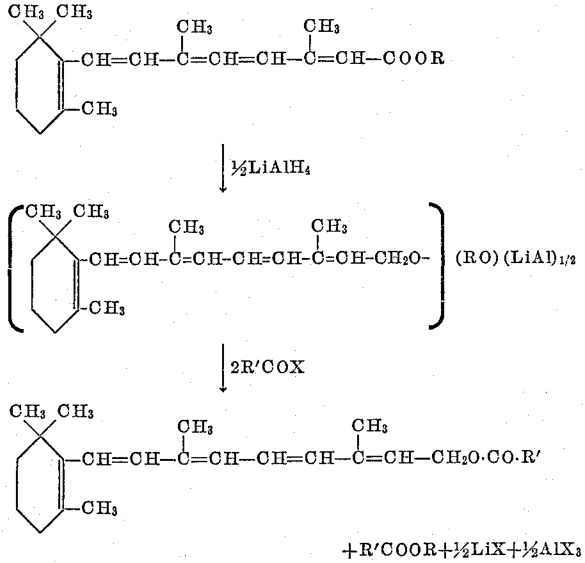

In the formulas, R means hydrogen atom or an alkyl radical, R′ means an aliphatic hydrocarbon residue, and X stands for a halogen atom. More concretely speaking, the compound to be used as the starting material in the present invention may be vitamin A acid itself, or its alkyl ester, in which the alkyl may be methyl, ethyl, or the higher alkyl, such as n-octyl, octadecyl, and the like. On the other hands, the acylating agent, namely the acid halide or anhydride, to be used in the present invention may be any saturated and unsaturated fatty acid halide or anhydride, having 1 to 18 carbon atoms. In general, acetyl halide and acetic anhydride are the preferable ones. When the halide is used, the halogen in the molecule may preferably be chlorine.

2

In carrying out the present invention, vitamin A acid or its alkyl ester dissolved in an inert solvent, such as anhydrous ethyl ether is added to a solution of lithium aluminum hydride in an inert solvent, such as anhydrous ethyl ether. The proportion of both reactants, kind of solvent, and other reaction conditions are wholly the same as in the known conditions for the reduction of a carboxylic acid or its ester to the corresponding carbinol compound, which would be apparent to those skilled in the art. In the conventional reduction process, the reaction mixture containing a lithium aluminum complex compound formed from vitamin A acid or its ester and lithium aluminum hydride is hydrolyzed by addition of water to form vitamin A. According to the present invention, however, the lithium aluminum complex compound is decomposed by addition of a fatty acid halide or anhydride, thereby to form a fatty acid ester of vitamin A. The fatty acid halide or anhydride may be any of those listed above, but the fatty acid halide yields more preferable results. In general, acetyl chloride and palmitoyl chloride are most preferable from the commercial and technical points of view.

The amount of the fatty acid halide or anhydride to be added is the stoichiometric amount or more (for example 20% more) as of lithium aluminum hydride employed; namely, 4 times mol or more, in case of vitamin A acid ester being used, or 8/3 times mol or more, in case of vitamin A acid being used, of fatty acid halide or anhydride as against mol amount of lithium aluminum hydride may be added.

In general, the fatty acid halide or anhydride is added slowly at a temperature below 0° C., preferably −5° C. to −50° C. After the completion of the reaction, the reaction mixture is mixed with aqueous acid solution, and the reaction product is recovered from the organic layer.

The invention will more fully be described with reference to the following examples, which, however, are set forth merely by way of illustration and not by way of limitation.

*Example 1*

A solution of 3.3 g. of lithium aluminum hydride in 250 cc. of anhydrous ethyl ether is cooled to −60° C., and a solution of 50 g. of vitamin A acid methyl ester (ultraviolet absorption maximum 355 m$\mu$, $\epsilon$ 42,800) in 200 cc. of anhydrous ethyl ether is dropped thereto while being stirred so as to keep the inner temperature not higher than −50° C. After completion of the addition, the stirring is continued at −30° C. for 1 hour. Thereafter, 28.3 g. of acetyl chloride is added dropwise to the mixture at a temperature below −20° C., and the stirring is continued at −20° C. for 4 hours more. After completion of the reaction, 200 cc. of aqueous 2% sulfuric acid solution is added to the mixture to decompose the unreacted compounds, and the ether layer is separated, and is washed twice with 50 cc. portions of saturated sodium bicarbonate solution, further washed with water until the layer becomes neutral, and dried on anhydrous Glauber's salt. Evaporation of the ether leaves 51.5 g. of yellow-orange oily vitamin A acetate (ultraviolet absorption maximum 326 mμ, ε 46,800).

Attached FIGURE 1 is an infrared absorption spectrum of the product of Example 1. The absorptions at 5.72μ and 8.14μ are in agreement with the standard specimen of vitamin A acetate.

The resulting vitamin A acetate is crystallized upon cooling to 5° C., and gives slightly yellow crystals, with M.P. 54–57° C., after washing with methanol.

*Example 2*

An ethereal solution of the complex compound is prepared as in Example 1, using 2.4 g. of lithium aluminum hydride, 25 g. of vitamin A acid, M.P. 180° C. (ultraviolet absorption maximum, 352 mμ, ε 44,950), and anhydrous ethyl ether. To the solution is added dropwise a solution of 49 g. palmitoyl chloride in 50 cc. anhydrous ether at a temperature below −20° C., and the mixture is stirred at −20° C. for 5 hours. After the completion of the reaction, 100 cc. of 2% sulfuric acid solution is added to the mixture to decompose the unreacted compounds, and the ether layer is separated, washed with a large amount of an aqueous dilute alkali solution, followed by washing with water until the ether layer becomes neutral, and finally dried over anhydrous Glauber's salt. Similar treatment as in Example 1 gives 41 g. of yellow oily vitaman A palmitate (ultraviolet absorption maximum 327 mμ, ε 47,500).

*Example 3*

Similarly as in Example 1, 30.4 g. of vitamin A acid methyl ester (ultraviolet absorption maximum 355 mμ, ε 42,600) is reduced with a solution of 2.3 g. of lithium aluminum hydride in 150 cc. of anhydrous ether. To the resulting solution of the complex compound in ether, 26 g. of acetic anhydride is dropped in at a temperature below −20° C., and stirring is continued at −20° C. for 2 hours. Then, the temperature is allowed to rise to 0° C. within 1 hour, and stirring is continued further for 2 hours at 0° C. After the decomposition with 150 cc. of 2% sulfuric acid solution, the ether layer is treated as in Example 1, giving 30.6 g. of vitamin A acetate (ultraviolet absorption maximum 326 mμ, ε 45,600).

What we claim is:

1. A process for preparing vitamin A esters, which comprises contacting a member selected from the group consisting of vitamin A acid and its alkyl ester with lithium aluminum hydride in an inert medium, and then decomposing the resulting lithium aluminum complex compound of vitamin A with an acylating agent selected from the group consisting of fatty acid halide and anhydride.

2. A process according to the claim 1, wherein said fatty acid halide and anhydride are those having 1 to 18 carbon atoms.

3. A process according to the claim 1, wherein said acylating agent is acetyl chloride.

4. A process according to the claim 1, said acylating agent is palmitoyl chloride.

5. An improvement in the process for preparing vitamin A esters from vitamin A acid and its alkyl ester by reduction with lithium aluminum hydride, which improvement comprises decomposing the resulting lithium aluminum complex compound of vitamin A with an acylating agent selected from the group consisting of fatty acid halide and anhydride.

6. A process according to the claim 1, wherein said decomposition reaction is carried out at a temperature of 0° to −50° C.

References Cited in the file of this patent

UNITED STATES PATENTS 2,709,712 Cawley et al. ---------- May 31, 1955
2,840,586 Inhoffen ------------- June 24, 1958